No. 727,671. PATENTED MAY 12, 1903.
T. R. McKNIGHT.
ELEVATING GRADER.
APPLICATION FILED JULY 8, 1901.
NO MODEL. 5 SHEETS—SHEET 1.
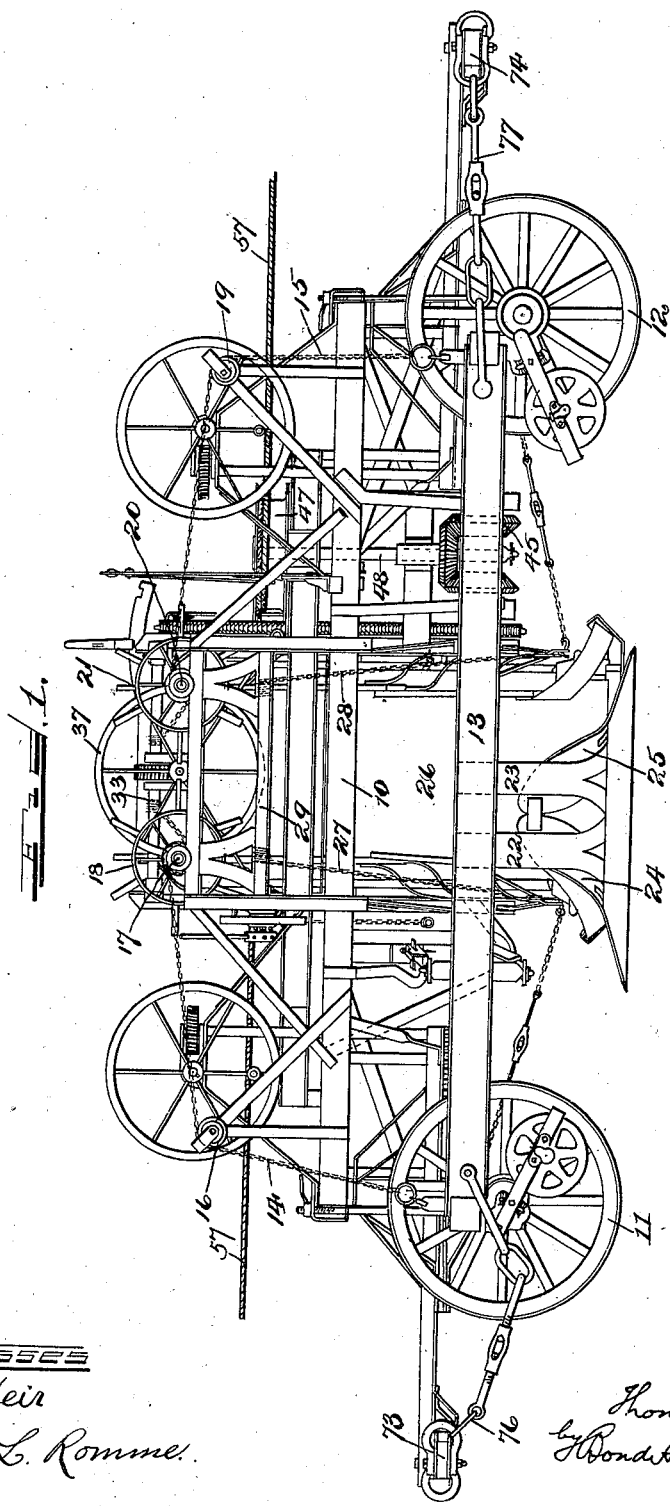

No. 727,671. PATENTED MAY 12, 1903.
T. R. McKNIGHT.
ELEVATING GRADER.
APPLICATION FILED JULY 8, 1901.
NO MODEL. 5 SHEETS—SHEET 2.
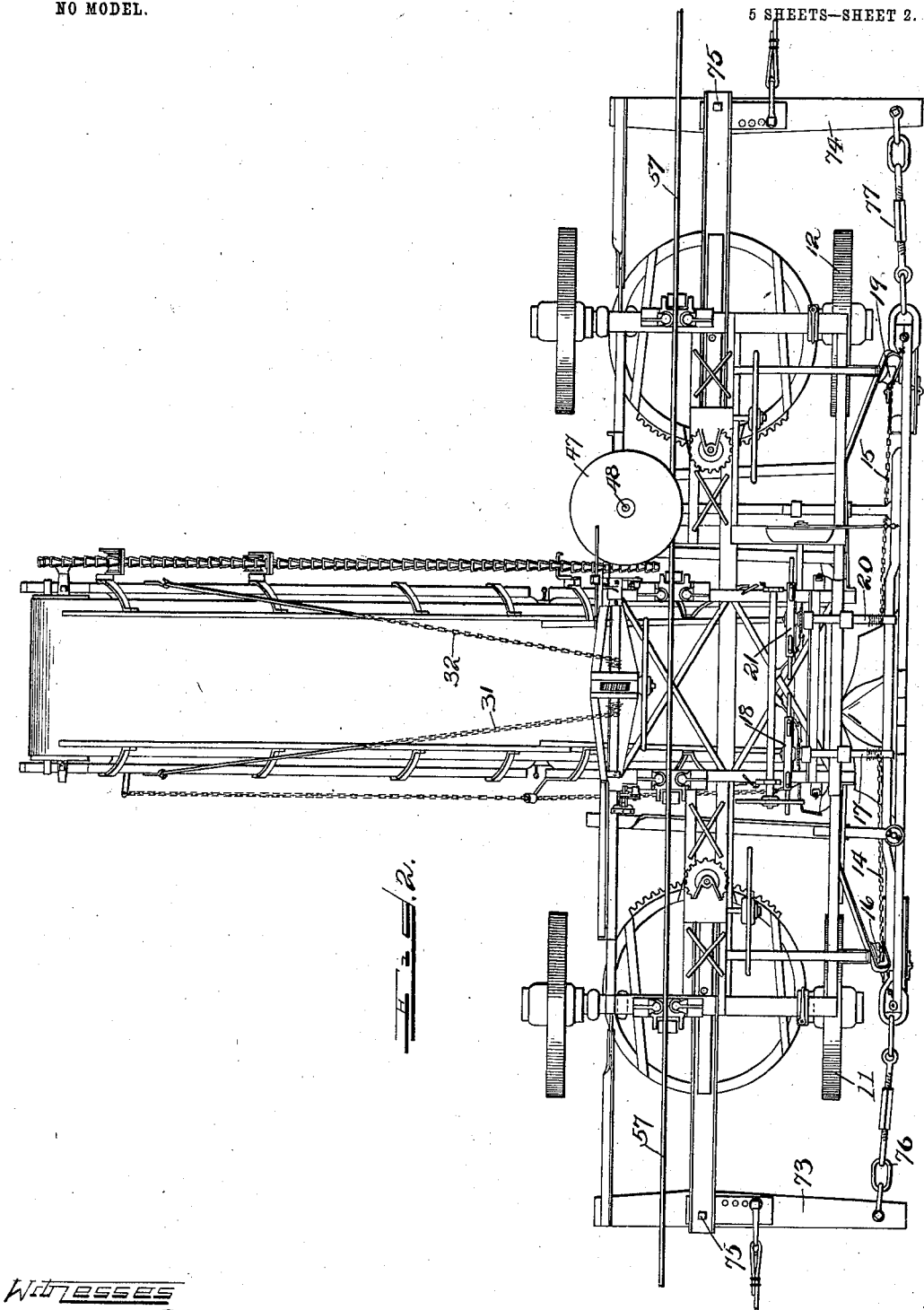

No. 727,671. PATENTED MAY 12, 1903.
T. R. McKNIGHT.
ELEVATING GRADER.
APPLICATION FILED JULY 8, 1901.
NO MODEL. 5 SHEETS—SHEET 3.
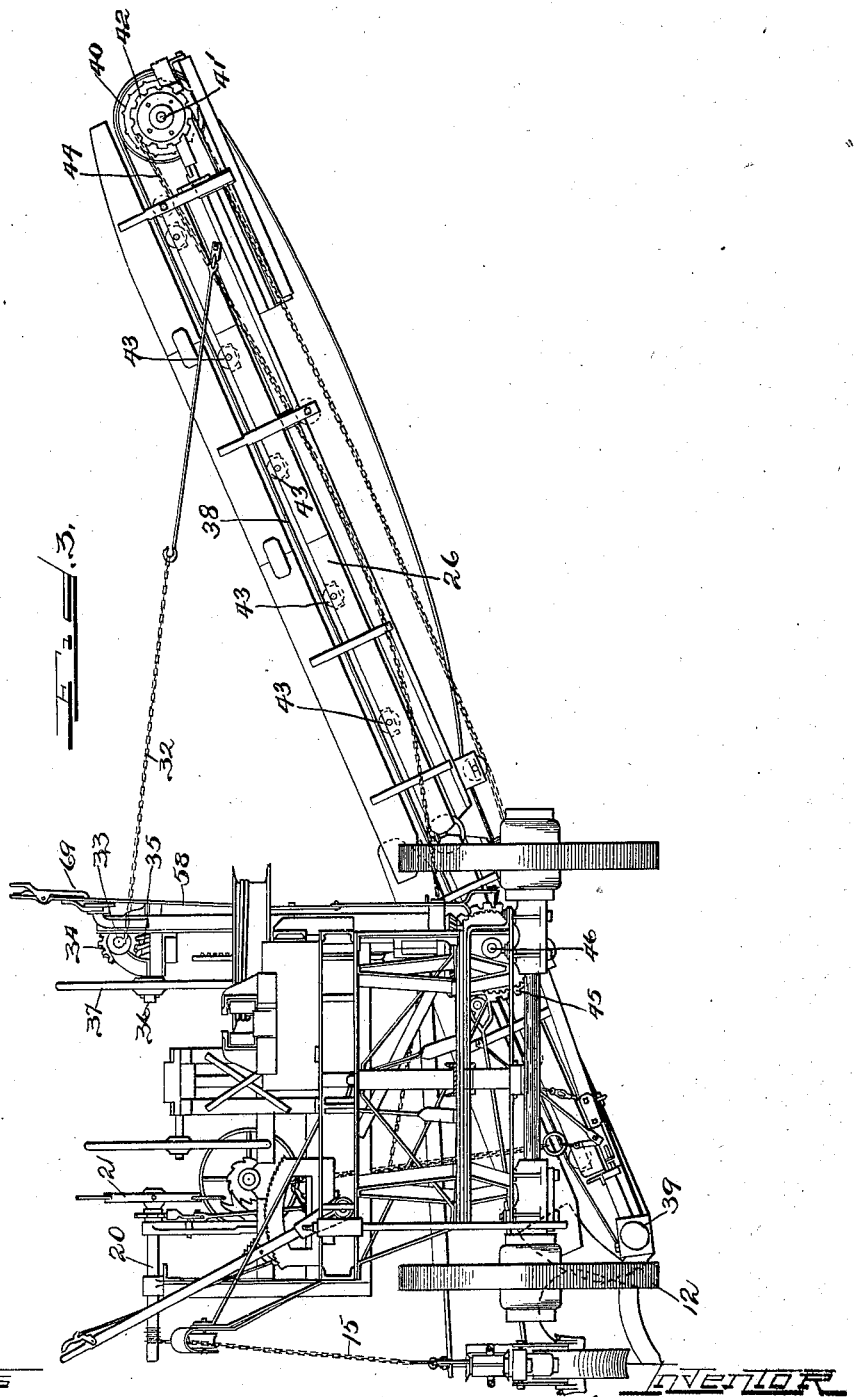

No. 727,671. PATENTED MAY 12, 1903.
T. R. McKNIGHT.
ELEVATING GRADER.
APPLICATION FILED JULY 8, 1901.
NO MODEL. 5 SHEETS—SHEET 4.
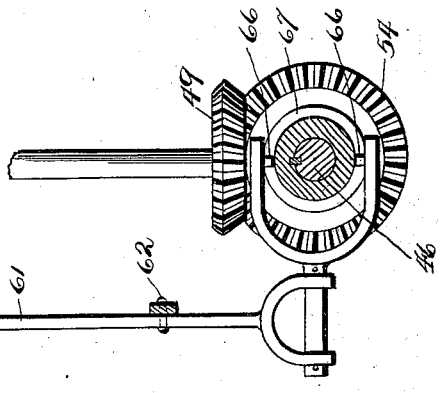
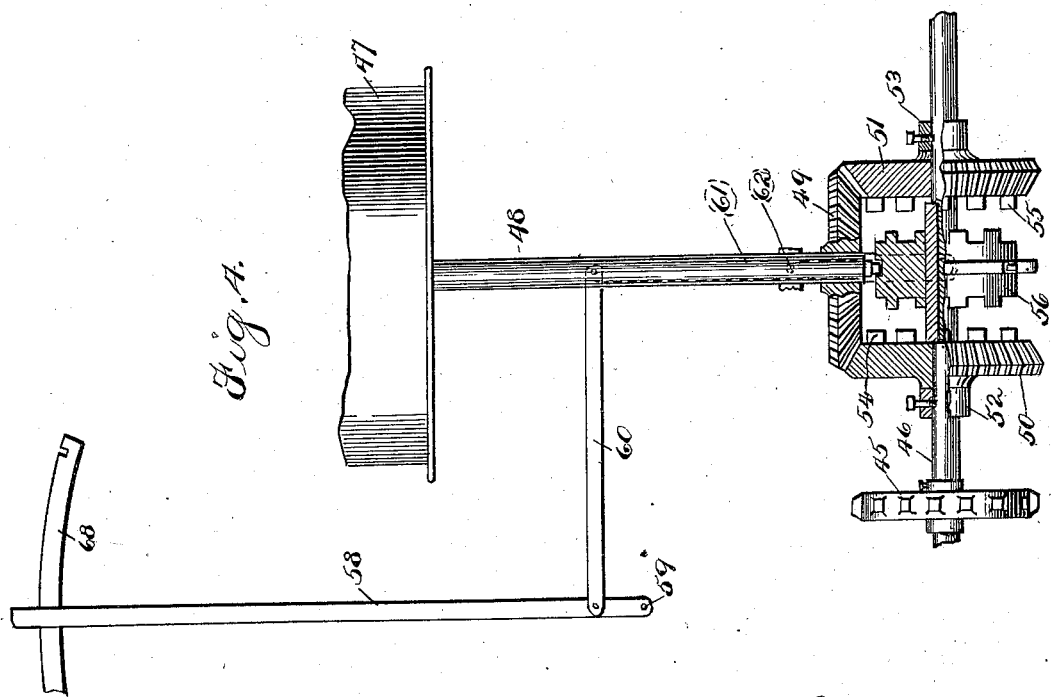

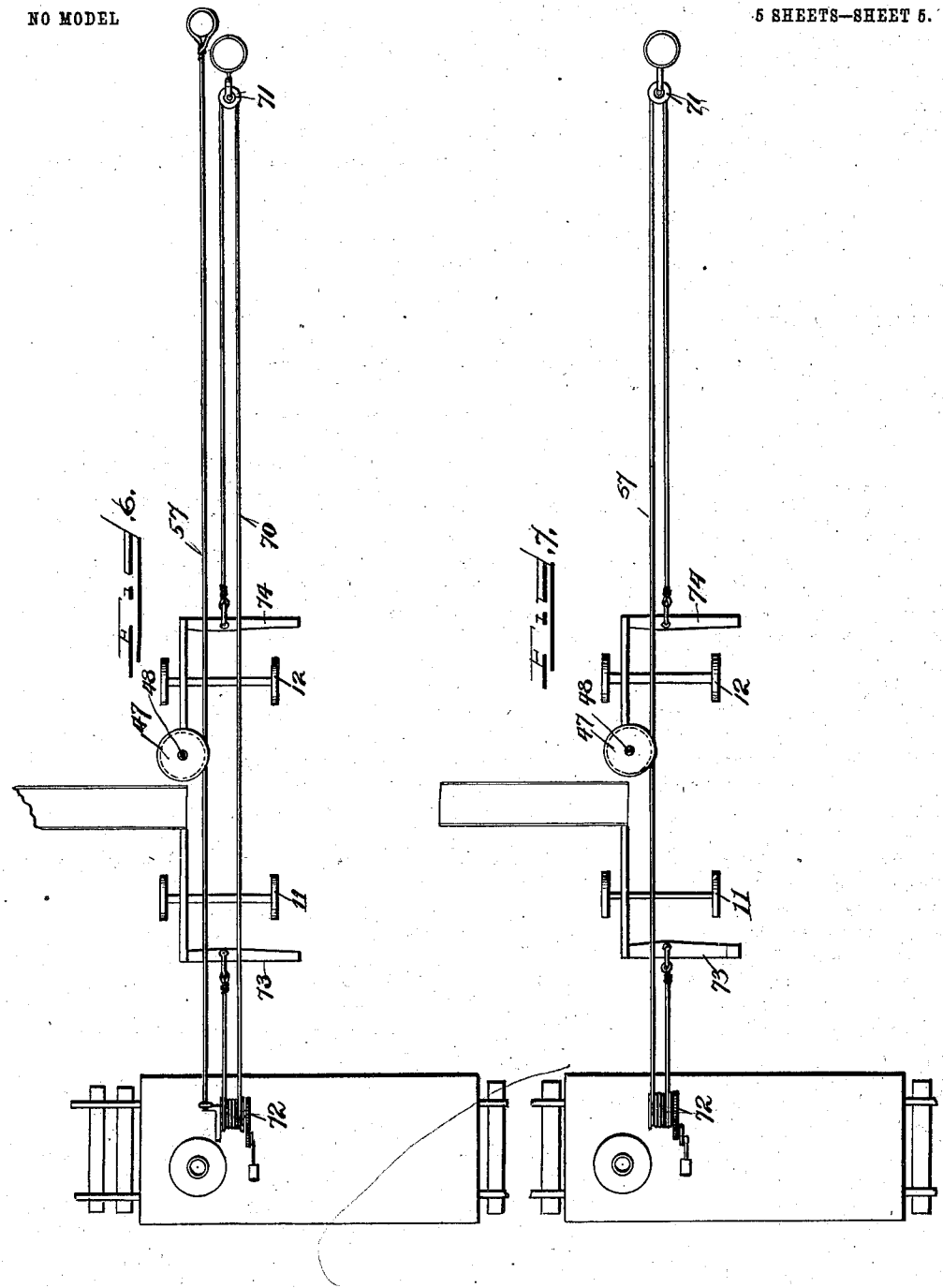

No. 727,671. Patented May 12, 1903.

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

ELEVATING-GRADER.

SPECIFICATION forming part of Letters Patent No. 727,671, dated May 12, 1903.

Application filed July 8, 1901. Serial No. 67,434. (No model.)

*To all whom it may concern:*

Be it known that I, THOMAS R. McKNIGHT, a citizen of the United States, residing at Aurora, in the county of Kane and State of Illinois, have invented certain new and useful Improvements in Elevating-Graders, of which the following is a specification, reference being had to the accompanying drawings.

My invention relates to grading-machines, and has to do particularly with wheeled grading-machines provided with plowing devices to break up the soil and with elevating devices adapted to receive the dirt thrown up by the plowing devices and discharge it upon a wagon or other conveyance. It has for its object to provide certain improvements in machines of this character, such improvements relating to the means for operating or driving the elevating devices as the machine progresses, to the plowing devices and the mounting thereof, and to the arrangement of the plowing devices with reference to the elevator so as to secure improved results.

As regards the mechanism for operating the elevating devices, my invention, generally stated, consists in providing the elevating devices with driving mechanism operated by a drum or equivalent device, which is in turn driven by means of a rope or equivalent device extending from end to end of the path to be traversed by the machines, the arrangement being such that as the machine progresses the rope, being wound around the drum, causes the drum to rotate, thereby driving the elevating devices. Suitable mechanism is provided for controlling the driving devices, so that the elevating devices are always operated in the same direction regardless of the direction in which the machine moves or the drum rotates. The ends of the rope may either be connected to the opposite ends of the machine after passing around pulleys at opposite ends of the field, or the ends of the rope may be fixedly secured at opposite ends of the field. In the latter case a separate rope or other mechanism is necessary for propelling the machine, while in the former arrangement by running the single rope around a windlass one rope alone is required.

In regard to the plowing mechanism and the mounting thereof my invention consists in providing a suitable carriage, having an elevator, with a double-ended plow arranged to operate when moved forward or backward, so that the machine may be reciprocated across a field and when moving in either direction will turn up a furrow and discharge the dirt upon the elevating devices.

Regarding the arrangement of the plowing devices with relation to the elevating devices, my invention consists in providing for adjustment of the plowing devices according to the direction in which the machine is moving, so that the dirt thrown up by the plow will be properly discharged upon the elevator regardless of the direction in which the machine is moving.

In addition to the foregoing my invention includes certain other improvements, which will be hereinafter pointed out.

That which I regard as new will be set forth in the claims.

In the accompanying drawings, Figure 1 is a side elevation. Fig. 2 is a plan view. Fig. 3 is an end view. Fig. 4 is a detail, partly in section, showing the arrangement of a part of the driving mechanism for the elevator. Fig. 5 is a detail, being a partial sectional view of the parts shown in Fig. 4; and Figs. 6 and 7 are diagrammatic views illustrating two arrangements of the driving devices for operating the elevator.

Referring to the drawings, 10 indicates the frame of the machine, which is supported on front wheels 11 and rear wheels 12 and carries the mechanism for operating and adjusting the various parts of the machine.

13 indicates a plow-beam, which is preferably an I-beam and extends, substantially, from one end of the machine to the other. It is suspended at one side of the machine by front and rear chains 14 15, respectively, the chain 14 extending over a pulley 16 to a shaft 17, carrying a hand-wheel 18, so that by rotating said hand-wheel the height of the forward end of the beam 13 may be adjusted. Similarly the chain 15 passes over a pulley 19 to a shaft 20, carrying a hand-wheel 21, by means of which it may be adjusted to vary the height of the rear end of the beam.

It may be well to explain that the terms "front" and "rear" as herein used are purely arbitrary and are employed for convenience only, since the machine is a double-ended one, and both ends are substantially alike. The term "front end" is herein used to indicate the left-hand end, (shown in Fig. 1,) while the term "rear end" is employed to designate the opposite end.

22 23 indicate plow-standards, the upper ends of which are secured to the beam 13 at about the longitudinal center thereof, as shown in Fig. 1. Said standards carry plows 24 25, reversely arranged, so that their points project away from each other, the moldboards of the plows being on the inside, as shown in Fig. 1, so that when moved in either direction the plows will turn up the soil and discharge it toward the machine, as shown in Fig. 3.

26 indicates an elevator which, as shown in Fig. 3, extends upward and outward, its lower end projecting under the frame 10 and terminating opposite the plows 24 25 and adjacent to them. The inner end of the elevator 26 is suspended by chains 27 28 from a shaft 29, extending longitudinally of the frame 10 and supported by it, said shaft carrying a hand-wheel 30, by which it may be rotated to adjust the height of the inner end of the elevator. The outer end of the elevator is supported by chains 31 32, which are connected to a shaft 33, carrying a worm-gear 34, which meshes with a worm 35, mounted on a shaft 36, carrying a hand-wheel 37, as best shown in Fig. 3, so that by rotating the hand-wheel 37 the shaft 33 may be adjusted to raise or lower the outer end of the elevator 26. The elevator 26 consists of a suitable frame carrying an endless belt 38, mounted on pulleys 39 40 at the lower and upper ends of the elevator-frame, respectively. The upper pulley 40 is mounted on a shaft 41, which carries a sprocket-wheel 42. Intermediate idler-pulleys 43 are provided to support the upper portion of the belt. The sprocket-wheel 42 is connected by a link belt 44 with a sprocket-wheel 45, mounted upon or keyed to a shaft 46, suitably supported in the frame of the machine, (see Figs. 3 and 4,) the arrangement being such that by rotating the shaft 46 the chain 44, and consequently the belt 38, may operate. Obviously the upper portion of the belt 38 must always move upward, and consequently it is necessary to rotate the shaft 46 always in the same direction.

The shaft 46 is operated from a drum 47, which is mounted at the upper end of a vertical shaft 48, suitably supported in the frame of the machine. At its lower end the shaft 48 carries a beveled pinion 49, mounted in a horizontal position and keyed to the shaft 48. The pinion 49 meshes with beveled pinions 50 51, respectively placed on the shaft 46 at opposite sides of the pinion 49, as shown in Fig. 4, said pinions being held in mesh by collars 52 53, respectively, but being loosely mounted on the shaft 46. On its inner face the pinion 50 carries a clutch-section 54, as shown in Fig. 4. Similarly the pinion 51 carries on its inner face a clutch-section 55. Between said clutch-sections is mounted a double-faced clutch 56, which is mounted on a feather on the shaft 46, so that it may slide thereupon and still rotate therewith. The clutch 56 is adapted to move into engagement with either of the clutch-sections 54 or 55; but when in engagement with one of them it is out of engagement with the other.

From the foregoing it will be seen that when the drum 47 rotates it will rotate the horizontal pinion 49; but unless the clutch 56 is moved into engagement with one or the other of the clutch-sections 54 55 the shaft 46 will not be rotated, since the pinions 50 51 will rotate idly thereupon. By moving the clutch 56 into engagement with the clutch-section 54 the shaft 46 will be rotated in the same direction as that in which the pinion 50 is rotated, whereas by moving said clutch into engagement with the clutch-section 55 the shaft 46 will be rotated from the pinion 51, and as such pinion rotates oppositely to the pinion 50 the shaft 46 will be rotated in a reverse direction.

The drum 47 is operated, when the machine is moved forward or backward, by means of a rope, as hereinafter described. In the arrangement shown in Fig. 6 a stationary rope 57 is employed, as shown, the ends of which are secured at opposite ends of the field, the rope being wound once or twice around the drum, so as to give it sufficient frictional engagement with said drum to cause it to rotate when the machine is moved. Obviously when the machine moves in one direction the drum will be correspondingly rotated, and when the machine is moved in the opposite direction the drum will be reversely rotated. In order, however, that the elevator-belt may be constantly moved in the same direction, it is necessary for the operator to shift the clutch 56 from one clutch-section to the other just before the machine reverses its movement, so that when the direction of rotation of the shaft 48 is reversed by the reversal in the direction of travel of the machine the direction of rotation of the shaft 46 will not be altered. The shifting of the clutch 56 is effected by means of a lever 58, suitably mounted in the frame of the machine upon a pivot 59 and connected by a link 60 with a rocking lever 61, pivoted at 62 and having at its lower end a yoke 63, in which is mounted the stem 64 of a yoke 65, the latter embracing the clutch 56, having teeth 66, which fit into an annular groove 67 in the periphery of the clutch, as best shown in Figs. 4 and 5. By operating the lever 58 the clutch 56 may be moved longitudinally of the shaft 46 to engage either of the clutch-sections 54 or 55. A segment 68 is provided, which is adapted to be engaged by a latch 69, carried by the lever 58, as best shown in Figs. 3 and 4.

When the stationary rope 57 is employed to drive the drum 47, a separate rope 70 is employed to operate the machine. As shown in Fig. 6, the ends of said rope are connected to the opposite ends of the machine, and at one end of the field is a stationary pulley 71 and at the other end a windlass or capstan 72, around which the rope passes, the arrangement being such that by operating the windlass the rope may be moved in either direction, correspondingly moving the machine.

In Fig. 7 I have shown an arrangement whereby a single rope is employed both to propel the machine and to operate the drum. In the construction shown in Fig. 7 the single rope, after passing around the pulley 71 and windlass 72, passes around the drum 47. With this arrangement smaller sprocket-wheels 40 45 should be employed than in the construction shown in Fig. 6, since with sprocket-wheels of the same diameter shown in Fig. 7 the belt would be driven at twice the speed. Other suitable means could be employed, however, to reduce the speed of the belt.

73 74 indicate draft-beams arranged at opposite ends of the machine, to which the ends of the rope are secured. Said beams are pivoted at 75 and project laterally, so that their ends lie substantially in line with the beam 13. The ends of the beam 13 are connected by flexible connections 76 77, respectively, with the adjacent ends of the draft-beams 73 74, as shown in Fig. 2. The ends of the rope are connected to the draft-beams 73 74 between the pivots 75 and the connections 76 or 77. The result is that when draft is applied to the draft-beam 73 the draft will be transmitted through the connections 76 to the front end of the beam 13. The length of the connections 76 and 77 is such, however, that the beam 13 will be permitted to fall back far enough to bring the moldboard of the active plow 24 opposite the lower end of the elevator 26, the moldboard of the inactive plow moving practically beyond said elevator. Similarly when draft is applied to the draft-beam 75 the draft will be transmitted to the rear end of the beam 13 through flexible connections 77; but the beam will fall back to the position shown in Fig. 1. The object of this arrangement is to insure the proper discharge upon the elevator of the dirt thrown up by the plow and at the same time make it possible to use a narrower elevator than could otherwise be employed. If the elevator were made of a width equal to the length of both plows, there would be a considerable waste, since a part only of the elevator would be in use at one time. By moving the moldboards of the two plows alternately squarely across the elevator a narrow elevator may be employed, and it may be continually worked to its greatest capacity.

In operation the machine is moved from one end to the other of the space to be excavated, the rope-driving devices being properly set out in the field, as described, and the machine being reciprocated by properly moving the rope by means of the windlass. When the machine reaches one end of the field, the operator moves the lever 58 to shift the clutch 56, so that when the machine starts back the shaft 46 will be rotated in the same direction as before. In whichever direction the machine moves one plow or the other will turn up the soil and discharge it upon the elevator-belt, which will carry it up and in turn discharge it into a wagon, car, or other conveyance.

I have described specifically the embodiment of my invention illustrated in the drawings, but wish it to be understood that it is not restricted to the specific details described except in so far as they are particularly claimed.

That which I claim as my invention, and desire to secure by Letters Patent, is—

1. In a road-grader, the combination of a wheeled carriage adapted to be reciprocated across a field, a beam supported by said carriage, furrow-opening devices carried by said beam, said furrow-opening devices being arranged back to back, elevating devices adapted to receive the soil thrown up by said furrow-opening devices when the carriage is moving in either direction, and means operated by the movement of the carriage in either direction for operating said elevating devices to elevate the soil, substantially as described.

2. In a grading-machine, the combination of a carriage, elevating devices, furrow-opening devices arranged back to back adjacent to the lower end of the elevating devices, and means for adjusting the position of said furrow-opening devices to bring the active furrow-opening device opposite the elevating devices, substantially as described.

3. In a grading-machine, the combination of a wheeled carriage, an elevator carried thereby, and furrow-opening devices arranged back to back supported by said carriage, said furrow-opening devices being movable longitudinally of the carriage to adjust their position relatively to the elevator, substantially as described.

4. In a grading-machine, the combination of a wheeled carriage, an elevator carried thereby, a beam suspended from the carriage at one side thereof, and oppositely-arranged plows, supported by said beam, adjacent to the lower end of the elevator, said beam being adjustable longitudinally of the carriage to vary the position of the plows with reference to the elevator, substantially as described.

5. In a grading-machine, the combination of a wheeled carriage, an elevator carried thereby, a beam suspended at one side of the carriage, oppositely-arranged plows carried by said beam adjacent to the lower end of the elevator, draft devices at opposite ends of the carriage, and flexible connecting devices connecting said beam with the draft devices at the ends of the carriage, said connecting devices being long enough to permit the beam to move back far enough to bring the active plow opposite the elevator, substantially as described.

6. In a grading-machine, the combination of a carriage, an elevator mounted thereon, said carriage being adapted to be reciprocated across a field, a beam supported by said carriage, furrow-opening devices carried by said beam and arranged to operate when the machine is moved in either direction, and means actuated by the movement of the carriage in either direction for driving the elevator constantly in the same direction, substantially as described.

7. In a grading-machine, the combination of a carriage, an elevator mounted thereon, furrow-opening devices adapted to discharge dirt upon said elevator when the machine is reciprocated across a field, a drum, means operated by the rotation of the drum for driving the elevator constantly in the same direction as the machine is reciprocated, and means operated by the movement of the machine for rotating said drum alternately in opposite directions as the machine is reciprocated, substantially as described.

8. In a grading-machine, the combination of a carriage, an elevator mounted thereon, furrow-opening devices adapted to discharge dirt upon said elevator when the machine is reciprocated across a field, a drum, means operated by the rotation of the drum for driving the elevator constantly in the same direction as the machine is reciprocated, and a rope extending across the field for rotating said drum, substantially as described.

9. In a grading-machine, the combination of a carriage, an elevator carried thereby, means for discharging dirt upon said elevator as the machine is reciprocated across a field, a drum, a rope extending across the field for rotating said drum, a shaft for driving said elevator, oppositely-arranged bevel-gears loosely mounted on said shaft, a bevel-gear meshing with said bevel-gears and driven by said drum, clutch mechanism non-rotatably mounted on said shaft and adapted to engage one or the other of said oppositely-arranged bevel-gears, and means for operating said clutch mechanism, substantially as described.

10. In a grading-machine, the combination of a carriage, an elevator carried thereby, plowing mechanism for discharging dirt upon said elevator, a drum, connecting devices for driving said elevator by the rotation of said drum, and a rope extending across the field and around said drum for rotating said drum as the machine progresses, substantially as described.

11. In a grading-machine, the combination of a carriage, an elevator carried thereby, plowing mechanism for discharging dirt upon said elevator, a drum, connecting devices for driving said elevator by the rotation of said drum, a rope extending across the field and around said drum for rotating said drum as the machine progresses, the ends of the rope being connected to opposite ends of the carriage and passing around pulleys at the opposite ends of the field, and means for operating said rope to reciprocate the machine, substantially as described.

12. In a grading-machine, the combination of a wheeled carriage, an elevator carried thereby, and furrow-opening devices supported by said carriage, said furrow-opening devices being movable longitudinally of the carriage to adjust their position relatively to the elevator, substantially as described.

13. In a grading-machine, the combination of a wheeled carriage, an elevator carried thereby, a beam supported by said carriage and movable longitudinally thereof, and furrow-opening means carried by said beam, substantially as described.

THOMAS R. McKNIGHT.

Witnesses:
G. C. PECK,
J. C. BEEDE.